United States Patent [19]
Lorenz et al.

[11] 3,755,344
[45] Aug. 28, 1973

[54] 3-OXO-BENZISOX AZOLEMETHYL-(THIONO) THIOLPHOSPHERIC (PHOSPHONIC) ACID ESTERS

[75] Inventors: Walter Lorenz, Wuppertal-Croneberg; Horst Boshagen, Haan/Rhineland; Ingeborg Hammann, Cologne; Wilhelm Stendel, Uppertal-Elberfeld, all of Germany

[73] Assignee: Bayer Aktiengesellschaft, Leverkusen, Germany

[22] Filed: Oct. 5, 1971

[21] Appl. No.: 186,812

[30] Foreign Application Priority Data
Oct. 9, 1970    Germany.................. P 20 49 691.7

[52] U.S. Cl. .............................. 260/307 A, 424/272
[51] Int. Cl........................................... C07d 85/18
[58] Field of Search ................................ 260/307 A

[56]    References Cited
FOREIGN PATENTS OR APPLICATIONS
22,968    4/1962    Germany Primary Examiner—Alex Mazel
Assistant Examiner—R. V. Rush
Attorney—Burgess, Dinklage & Sprung

[57]    ABSTRACT 3-oxo-benzisoxazolemethyl-(thiono)thiolphosphoric (phosphonic) acid esters of the general formula

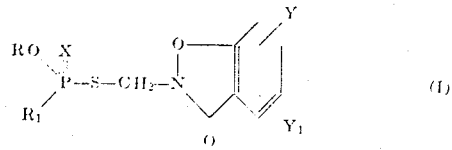

in which
R is an alkyl radical with 1–6 carbon atoms,
$R_1$ is an alkyl or alkoxy radical with 1–6 carbon atoms,
Y and $Y_1$ each is a hydrogen atom, a halogen atom, a nitro group or an alkyl radical with 1–6 carbon atoms, and
X is an oxygen or sulfur atom, which possess insecticidal and acaricidal properties.

7 Claims, No Drawings

3-OXO-BENZISOXAZOLEMETHYL-(THIONO) THIOLPHOSPHERIC (PHOSPHONIC) ACID ESTERS

The present invention relates to and has for its objects the provision of particular new 3-oxo-benzisoxazolemethyl-(thiono)thiolphosphoric(phosphonic) acid esters, i.e., 0,0-dialkyl-3-oxo-(optionally mono- or di-substituted)-benzisoxazolylmethylthiolphosphonic acid esters, their O-alkyl-alkanephosphonic acid ester analogues and the corresponding thiono esters, which possess insecticidal and acaricidal properties, active compositions in the form of mixtures of such compounds with solid and liquid dispersible carrier vehicles, and methods for producing such compounds and for using such compound in a new way especially for combating pests, e.g., insects and acarids with other and further objects becoming apparent from a study of the within specification and accompanying examples.

It is known from German Patent Specification 930,4-46 that phthalimido-methylthionothiolophosphonic acid esters, such as 0,0-dimethyl-S-phthalimidomethyl-dithiophosphoric acid ester [Compound A], exhibit insecticidal properties.

The present invention provides, as new compounds, the 3-oxo-benzisoxazolemethyl-(thiono)thiolphosphoric(phosphonic) acid esters of the general formula

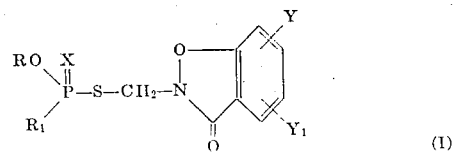

in which
R is an alkyl radical with 1–6 carbon atoms,
$R_1$ is an alkyl or alkoxy radical with 1–6 carbon atoms,
Y and $Y_1$ each is a hydrogen atom, a halogen atom, a nitro group or an alkyl radical with 1–6 carbon atoms, and
X is an oxygen or sulfur atom.

These new compounds have been found to exhibit strong insecticidal and acaricidal, including tickicidal, properties.

The present invention also provides a process for the preparation of a compound of the formula (I) above, in which a (thiono)thiolphosphoric(phosphonic) acid ester of the general formula:

is reacted, in the form of an alkali metal, alkaline earth metal or ammonium salt thereof or in the presence of an acid-binding agent, with a 3-oxo-halomethylbenzisoxazole of the general formula:

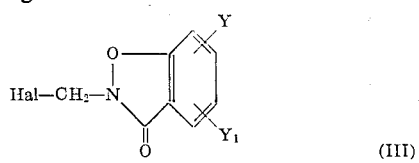

in which formulas
R, $R_1$, X, Y and $Y_1$ have the meanings stated above, and

Hal is a halogen atom, preferably a chlorine or bromine atom.

Surprisingly, the 3-oxo-benzisoxazolemethyl(thiono)-thiolphosphoric(phosphonic) acid esters according to the invention are distinguished by a considerably higher insecticidal and acaricidal activity than the known phthalimidomethylthionothiolphosphoric acid esters of analogous constitution and of the same directions of activity. The compounds according to the invention therefore represent a genuine enrichment of the art.

If, for example, 3-oxo-chloromethylbenzisoxazole and the ammonium salt of 0,0-diethylthionothiolphosphoric acid ester are used as starting materials, the reaction course can be represented by the following equation:

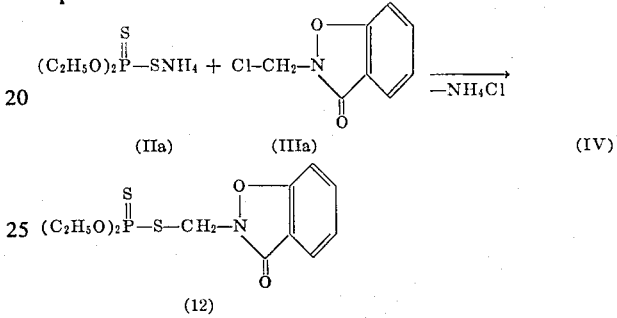

Preferably, in formulas (I), (II) and (III), R and $R_1$ each is a straight-chain or branched lower alkyl radical with 1-4 carbon atoms, namely methyl, ethyl, n- or isopropyl or n-, iso-, sec.- or tert.-butyl, $R_1$ alternatively denoting an alkoxy radical with 1–4 carbon atoms, namely methoxy, ethoxy, n- or isopropoxy or n-, iso-, sec.- or tert.-butoxy, and Y and $Y_1$ each is hydrogen, chlorine, bromine or an alkyl radical with 1–4 carbon atoms.

As examples of the (thiono)-thiolphosphoric(phosphonic) acid esters that can be used in the preparative process, there are mentioned: the alkali metal salts, alkaline earth metal salts or ammonium salts of 0,0-dimethyl-, 0,0-diethyl-, 0,0-dipropyl-, 0,0-diisopropyl-, 0,0-dibutyl-, 0,0-di-tert.-butyl-, 0-methyl-0-ethyl-, 0-methyl-0-propyl-, 0-methyl-0-isopropyl-, 0-methyl-0-butyl-, 0-ethyl-0-iso-propyl and 0-propyl-0-butyl-thiolphosphoric acid esters and their thiono analogues; and the corresponding salts of 0-methyl-methane-, 0-methyl-ethane-, 0-methyl-propane-, 0-methyl-isopropane-, 0-methyl-butane-, 0-ethyl-methane-, 0-ethyl-ethane-, 0-ethyl-propane-, 0-ethyl-butane-, 0-isopropyl-methane, 0-isopropyl-ethane-, 0-butyl-propane- and 0-butyl-tert.-butanethiolphosphonic acid esters and their thiono analogues.

The salts of the (thiono)-thiolphosphoric(phosphonic) acid esters of the formula (II) are known from the literature and, like the 3-oxobenzisoxazole derivatives of the formula (III), are available even on an industrial scale.

The process is preferably carried out with the use of suitable solvents or diluents. As such, practically all inert organic solvents are suitable, especially aliphatic and aromatic optionally chlorinated hydrocarbons, such as benzene, toluene, xylenes, benzine, methylene chloride, chloroform, carbon tetrachloride and chlorobenzene; ethers, such as diethyl ether, dibutyl ether and dioxane; ketones for example acetone and methyl ethyl, methyl iso-propyl and methyl iso-butyl ketones;

nitriles, such as acetonitrile and propionitrile; and alcohols, such as ethanol and propanol. As acid-binding agents, all customary acid-acceptors can be used. Particularly good results have been obtained with alkali metal carbonates and alcoholates, such as sodium and potassium carbonates, methylates and ethylates; as well as with aliphatic, aromatic and heterocyclic amines, for example triethylamine, dimethylamine, dimethylaniline, dimethylbenzylamine, and pyridine.

The reaction temperature can be varied within a fairly wide range. In general, the reaction is effected at from about 0° to 100° C, preferably at from about 30° to 40° C. The reaction is, in general, carried out at normal pressure.

For the carrying out of the process, the starting materials are in most cases used in equimolar amounts. An excess of one or the other of the reaction components brings no substantial advantages. The reaction is preferably carried out in the presence of one of the above-mentioned solvents, as well as in the presence of an acid acceptor (unless, of course, a salt of the compound of the formula (II) is used), at the temperatures stated, and the reaction mixture, after one to several hours of stirring — optionally with heating — is worked up in any customary manner.

The compounds according to the invention are obtained either in crystalline form or in the form of colorless to slightly yellow-colored, viscous, water-insoluble oils which cannot be distilled without decomposition but can, by so-called "slight distillation," that is by prolonged heating at moderately elevated temperatures under reduced pressure, be freed from the last volatile components and in this way be purified. For the characterization of the oils, the refractive indexes are especially suitable; the crystalline substances are characterized by their melting points.

As already mentioned the 3-oxobenzisoxazolemethyl-(thiono)thiolphosphoric(-phosphonic) acid esters are distinguished by an outstanding insecticidal and acaricidal effectiveness against crop pests, pests harmful to health and pests of stored products. They possess a good activity against both sucking and eating insects, and mites (Acarina), while exhibiting only a low phytotoxicity. They also exhibit tickicidal properties. For these reasons, the compounds of the invention may be used with success as pesticides in crop protection and the protection of stored products, as well as in the hygiene and veterinary fields.

To the sucking insects contemplated herein there belong, in the main aphids (Aphidae) such as the green peach aphid (*Myzus persicae*), the bean aphid (*Doralis fabae*), the bird cherry aphid (*Rhopalosiphum padi*), the pea aphid (*Macrosiphum pisi*) and the potato aphid (*Macrosiphum solanifolii*), the currant gall aphid (*Cryptomyzus korschelti*), the rosy apple aphid (*Sappaphis mali*), the mealy plum aphid (*Hyalopterus arundinis*) and the cherry black-fly (*Myzus cerasi*); in addition, scales and mealybugs (*Coccina*), for example the oleander scale (*Aspidiotus hederae*) and the soft scale (*Lecanium hersperidum*) as well as the grape mealybug (*Pseudococcus maritimus*); thrips (Thysanoptera), such as *Hercinothrips femoralis*, and bugs, for example the beet but (*Piesma quadrata*), the red cotton bug (*Dysdercus intermedius*), the bed bug (*Cimex lectularius*), the assassin bug (*Rhodnius prolixus*) and Chagas' bug (*Triatoma infestans*) and, further cicadas, such as *Euscelis bilobatus* and *Nephotettix bipunctatus*; and the like.

In the case of the biting insects contemplated herein, above all there should be mentioned butterfly caterpillars (Lepidoptera) such as the diamond-back moth (*Plutella maculipennis*), the gypsy moth (*Lymantria dispar*), the brown-tail moth (*Euproctis chrysorrhoea*) and tent caterpillar (*Malacosoma neustria*); further, the cabbage moth (*Mamestra brassicae*) and the cutworm (*Agrotis segetum*), the large white butterfly (*Pieris brassicae*), the small winter moth (*Cheimatobia brumata*), the green oak tortrix moth (*Tortrix viridana*), the fall armyworm (*Laphygma frugiperda*) and cotton worm (*Prodenia litura*), the ermine moth (*Hyponomeuta padella*), the Mediterranean flour moth (*Ephestia kuhniella*) and greater wax moth (*Galleria mellonella*); and the like.

Also to be classed with the biting insects contemplated herein are beetles (Coleoptera), for example the granary weevil (*Sitophilus granarius* = *Calandra granaria*), the Colorado beetle (*Leptinotarsa decemlineata*), the dock beetle (*Gastrophysa viridula*), the mustard beetle (*Phaedon cochleariae*), the blossom beetle (*Meligethes aeneus*), the raspberry beelte (*Byturus tomentosus*), the bean weevil (Bruchidius = *Acanthoscelides obtectus*), the leather beetle (*Dermestes frischi*), the khapra beetle (*Trogoderma granarium*), the flour beetle (*Tribolium castaneum*), the northern corn billbug (Calandra or *Sitophilus zeamais*), the drugstore beetle (*Stegobium paniceum*), the yellow mealworm (*Tenebrio molitor*) and the saw-toothed grain beetle (*Oryzaephilus surinamensis*), and also species living in the soil, for example wireworms (*Agriotes spec.*) and larvae of the cockchafer (*Melolontha melolontha*); cockroaches, such as the German cockroach (*Blattella germanica*), American cockroach (*Periplaneta americana*), Madeira cockroach (Leucophaea or *Rhyparobia maderae*), oriental cockroach (Blatta orientalis), the giant cockroach (*Blaberus giganteus*) and the black giant cockroach (*Blaberus fuscus*) as well as *Henschoutedenia flexivitta*; further, Orthoptera, for example the house cricket (*Acheta domesticus*); termites, such as the eastern subterranean termite (*Reticulitermes flavipes*) and Hymenoptera such as ants, for example the garden ant (*Lasius niger*); and the like.

The Diptera contemplated herein comprise essentially the flies, such as the vinegar fly (*Drosophila melanogaster*), the Mediterranean fruit fly (*Ceratitis capitata*), the house fly (*Musca domestica*), the little house fly (*Fannia canicularis*), the black blow fly (*Phormia regina*) and bluebottle fly (*Calliphora erythrocephala*) as well as the stable fly (*Stomoxys calcitrans*); further, gnats, for example mosquitoes such as the yellow fever mosquito (*Aedes aegypti*), the northern house mosquito (*Culex pipiens*) and the malaria mosquito (*Anopheles stephensi*); and the like.

With the mites (Acarina) contemplated herein there are classed, in particular, the spider mites (Tetranychidae) such as the two-spotted spider mite (*Tetranychus telarius* = *Tetranychus althaeae* or *Tetranychus urticae*) and the European red mite (*Paratetranychus pilosus* = *Panonychus ulmi*), gall mites, for example the black currant gall mite (*Eriophyes ribis*) and tarsonemids, for example the broad mite (*Hemitarsonemus latus*) and the cyclamen mite (*Tarsonemus pallidus*); finally, ticks, such as the relapsing fever tick (*Ornithodorus moubata*); and the like.

When applied against pests harmful to health, pests of stored products, particularly flies and mosquitoes, the compounds of the invention are also distinguished by an outstanding residual activity on wood and clay, as well as a good stability to alkali on limed substrates.

The active compounds according to the instant invention can be utilized, if desired, in the form of the usual formulations or compositions with conventional inert (i.e., plant compatible or herbicidally inert) pesticide diluents or extenders, i.e., diluents, carriers or extenders of the type usable in conventional pesticide formulations or compositions, e.g., conventional pesticide dispersible carrier vehicles such as gases, solutions, emulsions, suspensions, emulsifiable concentrates, spray powders, pastes, soluble powders, dusting agents, granules, etc. These are prepared in known manner, for instance by extending the active compounds with conventional pesticide dispersible liquid diluent carriers and/or dispersible solid carriers optionally with the use of carrier vehicle assistants, e.g., conventional pesticide surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: aerosol propellants which are gaseous at normal temperatures and pressures, such as freon; inert dispersible liquid diluent carriers, including inert organic solvents, such as aromatic hydrocarbons (e.g., benzene, toluene, xylene, etc.), halogenated, especially chlorinated, aromatic hydrocarbons (e.g., chlorobenzenes, etc.), paraffins (e.g., petroleum fractions), chlorinated aliphatic hydrocarbons (e.g., methylene chloride, etc.), alcohols (e.g., methanol, ethanol, propanol, butanol, etc.), amines (e.g., ethanolamine, etc.), ether-alcohols (e.g., glycol monomethyl ether, etc.), amides (e.g., dimethyl formamide, etc.), sulfoxides (e.g., dimethyl sulfoxide, etc.), ketones (e.g., acetone, etc.), and/or water; as well as inert dispersible finely divided solid carriers, such as ground natural minerals (e.g., kaolins, clays, alumina, silica, chalk, i.e., calcium carbonate, talc, attapulgite, montmorillonite, kieselguhr, etc.) and ground synthetic minerals (e.g., highly dispersed silicic acid, silicates, e.g., alkali silicates, etc.); whereas the following may be chiefly considered for use as conventional carrier vehicle assistants, e.g., surface-active agents, for this purpose: emulsifying agents, such as non-ionic and/or anionic emulsifying agents (e.g., polyethylene oxide esters of fatty acids, polyethylene oxide ethers of fatty alcohols, alkyl sulfonates, aryl sulfonates, etc., and especially alkyl arylpolyglycol ethers, magnesium stearate, sodium oleate, etc.); and/or dispersing agents, such as lignin, sulfite waste liquors, methyl cellulose, etc.

Such active compounds may be employed alone or in the form of mixtures with one another and/or with such solid and/or liquid dispersible carrier vehicles and/or with other known compatible active agents, especially plant protection agents, such as other acaricides and insecticides, or fungicides, bactericides, rodenticides, herbicides, fertilizers, growth-regulating agents, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1–95 percent by weight, and preferably 0.5–90 percent by weight, of the mixture, whereas carrier composition mixtures suitable for direct application of field application generally contemplate those in which the active compound is present in an amount substantially between about 0.0001–10 percent, preferably 0.01–1 percent, by weight of the mixture. Thus, the present invention contemplates over-all compositions which comprise mixtures of a conventional dispersible carrier vehicle such as (1) a dispersible inert finely divided carrier solid, and/or (2) a dispersible carrier liquid such as an inert organic solvent and/or water preferably including a surface-active effective amount of a carrier vehicle assistant, e.g., a surface-active agent, such as an emulsifying agent and/or a dispersing agent, and an amount of the active compound which is effective for the purpose in question and which is generally between about 0.0001–95 percent, and preferably 0.01–95 percent, by weight of the mixture.

The active compounds can also be used in accordance with the well known ultra-low-volume process with good success, i.e., by applying such compound if normally a liquid, or by applying a liquid compositon containing the same, via very effective atomizing equipment, in finely divided form, e.g., average particle diameter of from 50–100 microns, or even less, i.e., mist form, for example by airplane crop spraying techinques. Only up to at most about a few liters/hectare are needed, and often amounts only up to about 15 to 1,000 g/hectare, preferably 40 to 600 g/hectare, are sufficient. In this process it is possible to use highly concentrated liquid compositions with said liquid carrier vehicles containing from about 20 to about 95 percent by weight of the active compound or even the 100 percent active substance alone, e.g., about 20–100 percent by weight of the active compound.

Furthermore, the present invention contemplates methods of selectively killing, combating or controlling pests, e.g., insects and acarids, which comprises applying to at least one of correspondingly (a) such insets, (b) such acarids, and (c) the corresponding habitat thereof, i.e., the locus to be protected, a correspondingly combative or toxic amount, i.e., an insecticidally or acaricidally effective amount of the particular active compound of the invention alone or together with a carrier vehicle as noted above. The instant formulations or compositions are applied in the usual manner, for instance by spraying, atomizing, vaporizing, scattering, dusting, watering, squirting, sprinkling, pouring, fumigating, and the like.

It will be realized, of course, that the concentration of the particular active compound utilized in admixture with the carrier vehicle will depend upon the intended application. Therefore, in special cases it is possible to go above or below the aforementioned concentration ranges.

The synthesis and unexpected superiority and outstanding activiy of the particular new compounds of the present invention are illustrated, without limitation, by the following examples:

EXAMPLE 1

(a) 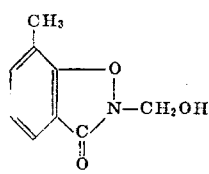

(Va)

329 g (2.21 moles) of 3-oxo-7-methyl-benzisoxazole (prepared according to Boshagen, Chem. Ber 100, 959 [1967]) are dissolved with 987 cc of 30 percent-strength formaldehyde on a water-bath. After the mixture has stood for half an hour at 80° C, it is allowed to cool; the 3-oxo-N-hydroxymethyl-7-methyl-benzisoxazole crystallizes out. After suction filtration, the crystalline product is washed with water and dried in the air. There is obtained a yellowish, granular powder of the melting point 112° C. The yield is 324g (81.9 percent of theory).

(b) 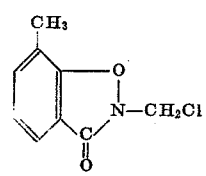

(IIIb)

322 g (1.8 moles) of 3-oxo-N-hydroxymethyl-7-methyl-1,2-benzisoxazole, produced in (a), are suspended in 1.3 l of methylenechloride. After addition of 5 ml of dimethyl formamide, there are added dropwise, with occasional external cooling, 257 g (2.16 moles) of thionylchloride to the mixture. After a short time, the solid components go into solution. The mixture is afterwards stirred for 1 hour and then washed neutral to Congo with water in a separating funnel. After drying over sodium sulfate, the solvent is distilled and 3-oxo-N-chloromethyl-7-methyl-benzisoxazole is obtained in small pink needles of the melting point 122° C. The yield is 302 g (85 percent of theory).

(c) 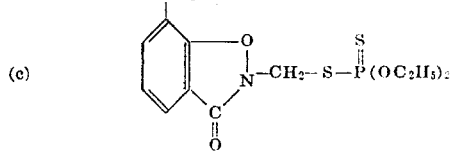

(I)

Into a solution of 146 g (0.72 mole) of the ammonium salt of 0,0-diethylthionothiolphosphoric acid in 300 ml acetone there are introduced 118 g (0.6 mole) of 3-oxo-N-chloromethyl-7-methyl-benzisoxazole, produced in (b). The temperature of the mixture rises to 35° C. After one hour of stirring the mixture is poured into water. The separating oil solidifies rapidly. The crystalline product is dissolved in ether. After washing of the ethereal solution with water and drying thereof over sodium sulfate, the solvent is distilled off. There remain behind 145 g (69.6 percent of theory) of 0,0-diethyl-S-(3-oxo-7-methyl-benzisoxazolylmethyl)-thionothiolphosphoric acid ester of the m.p. 54° C (colorless crystals).

|  | N | P | S |
|---|---|---|---|
| Calculated for $C_{13}H_{18}NOPS_2$ (molecular weight 347.4): | 4.0% | 8.9% | 18.4% |
| Found | 3.8% | 9.4% | 18.1% |

Analogously, the following compounds are prepared:

| Constitution | Physical properties | Yield (percent of theory) |
|---|---|---|
| (2) ![structure with CH₃, N—CH₂—S—P(OCH₃)₂] | M.P. 88° C., colorless crystals | 82.3 |
| (3) H₃C— ![structure with N—CH₂S—P(OC₂H₅)₂] | M.P. 67° C., yellow crystals | 84 |
| (4) H₃C— ![structure with N—CH₂S—P(S)(C₂H₅)(OC₂H₅)] | M.P. 63° C., pale yellow crystals | 73.5 |
| (5) H₃C— ![structure with N—CH₂S—P(OCH₃)₂] | M.P. 76° C., pale yellow crystals | 80 |
| (6) Cl— ![structure with CH₃, N—CH₂S—P(OC₂H₅)₂] | M.P. 58° C., colorless crystals | 87.5 |

| | Constitution | Physical properties | Yield (percent of theory) |
|---|---|---|---|
| (7) | CH₃-substituted benzisoxazolone with N-CH₂S-P(S)(C₂H₅)(OC₂H₅) | $n_D^{21}$=1.5915 (light-brown oil) | 89.4 |
| (8) | Cl-substituted with N-CH₂S-P(S)(OC₂H₅)₂ (open form) | M.P. 58° C. (colorless crystals) | 68 |
| (9) | Cl-benzisoxazolone N-CH₂S-P(S)(OCH₃)₂ | M.P. 76° C. (colorless crystals) | 63.8 |
| (10) | Cl-benzisoxazolone N-CH₂S-P(O)(OC₂H₅)₂ | M.P. 49° C. (colorless crystals) | 25 |
| (11) | Cl-benzisoxazolone N-CH₂S-P(S)(OCH₃)(OC₃H₇i) | $n_D^{23}$=1.5855 (pale yellow oil) | 87 |
| (12) | benzisoxazolone N-CH₂S-P(S)(OC₂H₅)₂ | $n_D^{21}$=1.5778 (yellow oil) | 88 |
| (13) | benzisoxazolone N-CH₂S-P(O)(OCH₃)₂ | $n_D^{21}$=1.5985 (yellow oil) | 82 |
| (14) | benzisoxazolone N-CH₂S-P(O)(OC₂H₅)₂ | $n_D^{21}$=1.5524 | 84.2 |
| (15) | benzisoxazolone N-CH₂S-P(S)(C₂H₅)(OC₂H₅) | $n_D^{21}$=1.5975 (light-brown oil) | 93 |
| (16) | benzisoxazolone N-CH₂S-P(S)(OCH₃)(OC₃H₇i) | $n_D^{21}$=1.5787 (light-yellow oil) | 90.5 |
| (17) | CH₃-benzisoxazolone N-CH₂S-P(S)(OC₂H₅)(C₂H₅) | M.P. 83° (colorless crystals) | 83 |

| Constitution | Physical properties | Yield (percent of theory) |
|---|---|---|
| (18) (H$_3$C)$_3$C— [benzisoxazolone]—N—CH$_2$S—P(=S)(C$_2$H$_5$)(OC$_2$H$_5$) | $n_D^{21}$=1.5652 (yellow oil) | 93.7 |
| (19) (H$_3$C)$_3$C— [benzisoxazolone]—N—CH$_2$S—P(=S)(OC$_2$H$_5$)$_2$ | $n_D^{21}$=1.5574 (yellow oil) | 8 |
| (20) Br— [benzisoxazolone]—N—CH$_2$S—P(=S)(OC$_2$H$_5$)$_2$ | $n_D^{21}$=1.5943 (light-brown oil) | 82 |

EXAMPLE 2

Plutella test
 Solvent: 3 parts by weight acetone
 Emulsifier: 1 part by weight aklylaryl polyglycol ether To produce a suitable preparation of active compound, 1 part by weight of the active compound is mixed with the stated amount of solvent containing the stated amount of emulsifier and the concentrate is diluted with water to the desired concentration.

Cabbage leaves (*Brassica oleracea*) are sprayed with the preparation of the active compound until dew moist and are then infested with caterpillars of the diamondback moth (*Plutella maculipennis*).

After the specified periods of time, the degree of destruction is determined as a percentage 100 percent means that all the caterpillars are killed whereas 0 percent means that none of the caterpillars are killed.

The active compounds, the concentrations of the active compounds, the evaluation times and the results can be seen from Table 1:

TABLE 1
(Plutella test)

| Active compound | Concentration of active compound in percent | Degree of destruction in percent after 3 days |
|---|---|---|
| (A) [phthalimide]—N—CH$_2$—S—P(=S)(OCH$_3$)$_2$ (known) | 0.1<br>0.01<br>0.001 | 100<br>100<br>0 |
| (13) [benzisoxazolone]—N—CH$_2$S—P(=S)(OCH$_3$)$_2$ | 0.1<br>0.01<br>0.001 | 100<br>100<br>65 |
| (12) [benzisoxazolone]—N—CH$_2$S—P(=S)(OC$_2$H$_5$)$_2$ | 0.1<br>0.01<br>0.001 | 100<br>100<br>45 |
| (15) [benzisoxazolone]—N—CH$_2$S—P(=S)(C$_2$H$_5$)(OC$_2$H$_5$) | 0.1<br>0.01<br>0.001 | 100<br>100<br>50 |
| (9) Cl—[benzisoxazolone]—N—CH$_2$S—P(=S)(OCH$_3$)$_2$ | 0.1<br>0.01<br>0.001 | 100<br>100<br>30 |

TABLE 1 — Continued (Plutella test)

| Active compound | Concentration of active compound in percent | Degree of destruction in percent after 3 days |
|---|---|---|
| (10) [structure: Cl-phenyl-isoindoline-1,3-dione with N–CH₂S–P(OC₂H₅)₂] | 0.1<br>0.01<br>0.001 | 100<br>100<br>30 |

EXAMPLE 3

Phaedon larvae test
  Solvent: 3 parts by weight acetone
  Emulsifier: 1 part by weight alkylaryl polyglycol ether To produce a suitable preparation of active compound, 1 part by weight of the active compound is mixed with the stated amount of solvent containing the stated amount of emulsifier, and the concentrate is diluted with water to the desired concentration.

Cabbage leaves (*Brassica oleracea*) are sprayed with the preparation of the active compound until dripping wet and then infested with mustard beetle larvae (*Phaedon cochleariae*).

After the specified periods of time, the degree of destruction is determined as a percentage: 100 percent means that all the beetle larvae are killed. 0 percent means that none of the beetle larvae are killed.

The active compounds, the concentration of the active compound, the times of evaluation and the results can be seen from the following Table 2:

EXAMPLE 4

Myzus test (contact action)
  Solvent: 3 parts by weight acetone
  Emulsifier: 1 part by weight alkylaryl polyglycol ether To produce a suitable preparation of active compound, 1 part by weight of the active compound is mixed with the stated amount of solvent containing the stated amount of emulsifier and the concentrate is diluted with water to the desired concentration.

Cabbage plants (*Brassica oleracea*) which have been heavily infested with peach aphids (*Myzus persicae*) are sprayed with the preparation of the active compound until dripping wet.

After the specified periods of time, the degree of destruction is determined as a percentage: 100 percent means that all the aphids are killed whereas 0 percent means that none of the aphids are killed.

The active compounds, the concentrations of the active compounds, the evaluation times and the results can be seen from the following Table 3:

TABLE 2

(Phaedon larvae test)

| Active compound | Concentration of active compound in percent | Degree of destruction in percent after 3 days |
|---|---|---|
| (A) [structure: phthalimide N–CH₂–S–P(OCH₃)₂ with =S] (known) | 0.1<br>0.01<br>0.001 | 100<br>100<br>0 |
| (14) [structure: benzisoxazinone N–CH₂S–P(OC₂H₅)₂ with =O] | 0.1<br>0.01<br>0.001 | 100<br>100<br>40 |

TABLE 3
(Myzus test)

| Active compound | Concentration of active compound in percent | Degree of destruction in percent after 1 day |
|---|---|---|
| (A) (known) — phthalimide-N-CH$_2$-S-P(S)(OCH$_3$)$_2$ | 0.1<br>0.01<br>0.001 | 100<br>80<br>0 |
| (15) — benzisoxazinone-N-CH$_2$S-P(S)(C$_2$H$_5$)(OC$_2$H$_5$) | 0.1<br>0.01<br>0.001 | 100<br>100<br>95 |
| (1) — 7-CH$_3$-benzisoxazinone-N-CH$_2$S-P(S)(OC$_2$H$_5$)$_2$ | 0.1<br>0.01<br>0.001 | 100<br>100<br>90 |
| (17) — CH$_3$-benzisoxazinone-N-CH$_2$S-P(S)(OC$_2$H$_5$)(C$_2$H$_5$) | 0.1<br>0.01<br>0.001 | 100<br>98<br>90 |
| (18) — (H$_3$C)$_3$C-benzisoxazinone-N-CH$_2$S-P(S)(C$_2$H$_5$)(OC$_2$H$_5$) | 0.1<br>0.01<br>0.001 | 100<br>100<br>50 |
| (11) — Cl-CH=CH-benzisoxazinone-N-CH$_2$S-P(S)(OCH$_3$)(OC$_3$H$_7$i) | 0.1<br>0.01<br>0.001 | 100<br>100<br>95 |
| (6) — CH$_3$,Cl-benzisoxazinone-N-CH$_2$S-P(S)(OC$_2$H$_5$)$_2$ | 0.1<br>0.01<br>0.001 | 100<br>100<br>100 |
| (7) — CH$_3$,Cl-benzisoxazinone-N-CH$_2$S-P(S)(C$_2$H$_5$)(OC$_2$H$_5$) | 0.1<br>0.01<br>0.001 | 100<br>100<br>100 |
| (4) — H$_3$C-benzisoxazinone-N-CH$_2$S-P(S)(C$_2$H$_5$)(OC$_2$H$_5$) | 0.1<br>0.01<br>0.001 | 100<br>100<br>99 |
| (20) — Br-benzisoxazinone-N-CH$_2$S-P(S)(OC$_2$H$_5$)$_2$ | 0.1<br>0.01<br>0.001<br>0.0001 | 100<br>100<br>100<br>40 |

Example 5

Tetranychus test

Solvent: 3 part by weight acetone
Emulsifier: 1 part by weight alkylarylpolyglycol ether To produce a suitable preparation of active compound, 1 part by weight of the active compound is mixed with the stated amount of solvent containing the stated amount of emulsifier and the concentrate so obtained is diluted with water to the desired concentration Bean plants (*Phaseolus vulgaris*), which have a height of approximately 10–30 cm., are sprayed with the preparation of the active compound until dripping wet. These bean plants are heavily infested with spider mites (*Tetranychus urticae*) in all stages of development.

After the specified periods of time, the effectiveness of the preparation of active compound is determined by counting the dead mites. The degree of destruction thus obtained is expressed as a percentage: 100 percent means that all the spider mites are killed whereas 0 percent means that none of the spider mites are killed.

The active compounds, the concentrations of the active compounds, the evaluation times and the results can be seen from the following Table 4:

Emulsifier: 35 parts by weight nonylphenolpolyglycol ether.

To produce a suitable preparation of active compound, 30 parts by weight of the active substance concerned is mixed with the stated amount of solvent which contains the above mentioned proportion of emulsifier, and the concentrate so obtained is diluted with water to the desired concentration.

About 20 fly larvae (*Lucilia cuprina*) are put into a test-tube which contains about 2 cc of horse musculature. 0.5 ml of the preparation of active compound are applied to this horseflesh. After 24 hours, the degree of destruction is determined as a percentage. 100 percent means that all, 0 percent that no, larvae have been killed.

The active compound tested, the concentration applied and the test results obtained can be seen from Table 5:

Example 7

Tick test

Solvent: 35 parts by weight ethyleneglycol-monomethyl ether
Emulsifier: 35 parts by weight nonylphenolpolyglycol ether TABLE 4
(Tetranychus test)

| Active compound | | Concentration of active compound in percent | Degree of destruction in percent after 2 days |
|---|---|---|---|
| (A) | 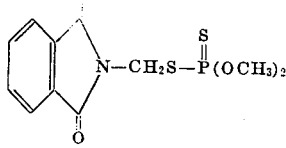 (known) | 0.1 | 0 |
| (13) | 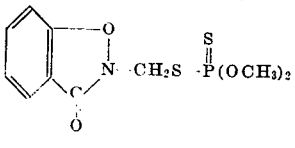 | 0.1<br>0.01 | 100<br>90 |
| (12) | 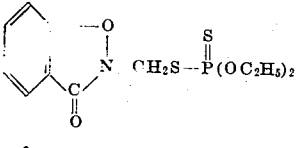 | 0.1 | 95 |
| (15) | 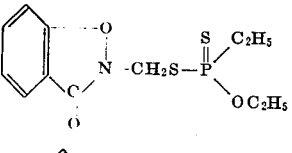 | 0.1<br>0.01 | 100<br>90 |
| (10) | 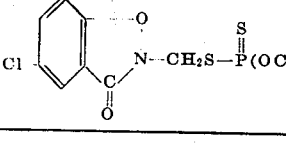 | 0.1 | 80 |

Example 6

Test with parasitizing fly larvae

Solvent: 35 parts by weight ethyleneglycol-monomethyl ether.

To produce a suitable formulation, 3 parts by weight of the active compound are mixed with 7 parts by weight of the above-mentioned solvent-emulsifier mixture, and the emulsion concentrate so obtained is diluted with water to the concentration desired in each case.

Adult, gorged female ticks of the species *Boophilus microplus* (sensitive and resistant, respectively) are immersed for 1 minute in these preparations of active compound. After immersion of, in each case, 10 female specimens of the various tick species, they are transferred to Petri dishes, the bottom of which is covered with a correspondingly large filter disc.

After 10 days, the effectiveness of the preparation of active compound is determined by ascertaining the inhibition of egg deposition compared with untreated control ticks. The effect is expressed as a percentage, 100 percent meaning that eggs ceased to be deposited, and 0 percent signifying that the ticks deposited eggs in normal amount.

The active compounds investigated, the concentrations tried, the parasites tested and the findings obtained can be seen from the following Table 5:

TABLE 5

| Active compound | Concentration of active compound in p.p.m. | Degree of destruction in percent (*Lucilia cuprina*) | Concentration of active compound in p.p.m. | Inhibition of egg deposition in percent (*Boophilus microplus*) | |
|---|---|---|---|---|---|
| | | | | Ridge-land strain | Biarra strain |
| (8) Cl—[benzisoxazolone]—N—CH$_2$S—P(=S)(OC$_2$H$_5$)$_2$ | 10,000<br>100<br>50<br>25 | | | 100<br>100<br>100<br><50 | |
| (9) Cl—[benzisoxazolone]—N—CH$_2$S—P(=S)(OCH$_3$)$_2$ | 5,000<br>500 | | | 100<br><50 | |
| (10) Cl—[benzisoxazolone]—N—CH$_2$S—P(=O)(OC$_2$H$_5$)$_2$ | 5,000<br>500 | | | 100<br><50 | |
| (11) Cl—[benzisoxazolone]—N—CH$_2$S—P(=S)(OCH$_3$)(OC$_3$H$_7$i) | 100 | >50 | 500<br>250<br>100<br>50<br>25 | 100<br>100<br>>50<br><50<br><50<br><50 | |
| (12) [benzisoxazolone]—N—CH$_2$S—P(=S)(OC$_2$H$_5$)$_2$ | 300<br>30 | 100<br>100 | 10,000<br>1,000<br>100 | 100<br>>50<br><50 | 100<br>>50<br><50 |
| (13) [benzisoxazolone]—N—CH$_2$S—P(=S)(OCH$_3$)$_2$ | 300<br>30 | 100<br>100 | 10,000 | <50 | <50 |
| (14) [benzisoxazolone]—N—CH$_2$S—P(=O)(OC$_2$H$_5$)$_2$ | 300<br>30 | 100<br>100 | 10,000<br>1,000 | 100<br>>50 | 100<br>>50 |
| (15) [benzisoxazolone]—N—CH$_2$S—P(=S)(C$_2$H$_5$)(OC$_2$H$_5$) | 300<br>30 | 100<br>100 | 10,000<br>1,000<br>100 | 100<br>>50<br>>50 | 100<br>>50<br>>50 |

TABLE 5 —Continued

| Active compound | Concentration of active compound in p.p.m. | Degree of destruction in percent (Lucilia cuprina) | Concentration of active compound in p.p.m. | Inhibition of egg deposition in percent (Boophilus microplus) | |
|---|---|---|---|---|---|
| | | | | Ridgeland strain | Biarra strain |
| (16) 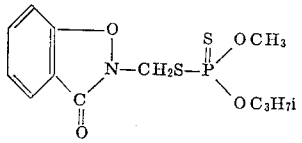 | 300 | 100 | 10,000 | 100 | |
| | | | 1,000 | 100 | |

It will be appreciated that the instant specification and examples are set forth by way of illustration and not limitation, and that various modifications and changes may be made without departing from the spirit and scope of the present invention.

What is claimed is:

1. A 3-oxo-benzisoxazolemethyl-(thiono)thiolphosphoric (phosphonic) acid ester of the formula:

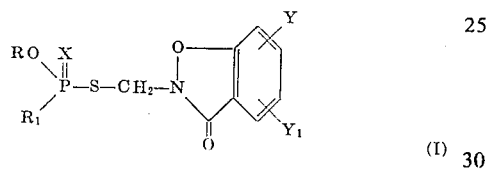

(I)

in which
R is an alkyl radical with 1-6 carbon atoms,
$R_1$ is an alkyl or alkoxy radical with 1-6 carbon atoms,
Y and $Y_1$ each is a hydrogen atom, a halogen atom or an alkyl radical with 1-6 carbon atoms, and
X is an oxygen or sulfur atom.

2. A compound according to claim 1, in which R is a straight-chain or branched alkyl radical with 1-4 carbon atoms, $R_1$ is a straight-chain or branched alkyl or alkoxy radical with 1-4 carbon atoms, and Y and $Y_1$ each is hydrogen, chlorine, bromine or alkyl with 1-4 carbon atoms.

3. The compound according to claim 1 wherein such compound is 0-methyl-0-isopropyl-S-(3-oxo-5-chloro-benzisoxazolylmethyl)-thionothiolphosphoric acid ester of the formula

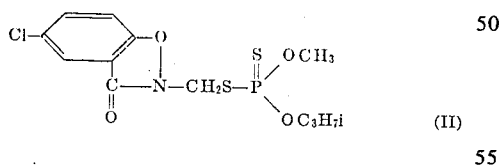

(II)

4. The compound according to claim 1 wherein such compound is 0,0-diethyl-S-(3-oxo-benzisoxazolylmethyl)-thionothiolphosphoric acid ester of the formula

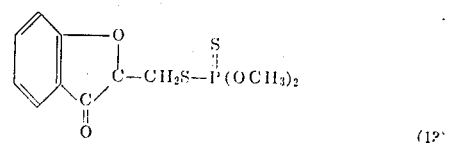

(12)

5. The compound according to claim 1 wherein such compound is 0,0-dimethyl-S-(3-oxo-benzisoxazolylmethyl)-thionothiolphosphoric acid ester of the formula

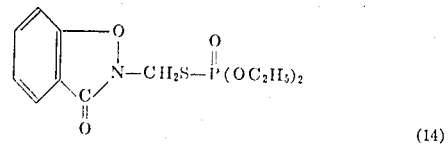

(13)

6. The compound according to claim 1 wherein such compound is 0,0-diethyl-S-(3-oxo-benzisoxazolylmethyl)-thiolphosphoric acid ester of the formula

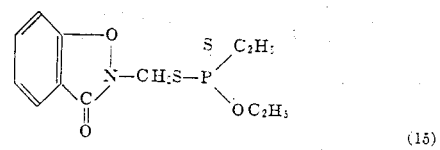

(14)

7. The compound according to claim 1 wherein such compound is 0-ethyl-S-(3-oxo-benzisoxazolylmethyl)-ethanethiono-thiolphosphonic acid ester of the formula (15)

* * * * *

UNITED STATES PATENT OFFICE
CERTIFICATE OF CORRECTION

Patent No. 3,755,344  Dated August 28, 1973

Inventor(s) Walter Lorenz et al

It is certified that error appears in the above-identified patent and that said Letters Patent are hereby corrected as shown below:

Col. 1, line 1 - in the title - change " BENZISOX AZOLEMETHYL"

to -- BENZISOXAZOLEMETHYL -- ;

line 2- in the title - correct spelling of "THIOLPHOSPHORIC"

Col. 3, line 61, correct spelling of "hesperidum";

line 64, after "beet" change "but" to -- bug --.

Cols. 7-8, Table in Example 1, compound (3), under the heading "Yield (percent of theory)" change "84." to

-- 84.5--.

Col. 9, Table in Example 1, compound (7), correct formula to read as follows:

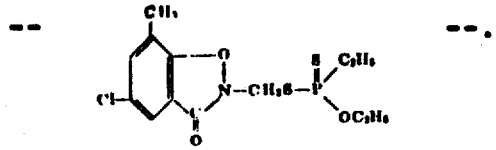

Col. 11, Table in Example 1, compound (19), under heading

"Yield (percent of theory)", change "8" to --87--.

Col. 12, line 26, after "percentage" insert -- : --.

Signed and sealed this 17th day of September 1974.

(SEAL)
Attest:

McCOY M. GIBSON JR.  C. MARSHALL DANN
Attesting Officer  Commissioner of Patents